(12) United States Patent
Greif et al.

(10) Patent No.: US 8,093,977 B2
(45) Date of Patent: Jan. 10, 2012

(54) MAGNET ASSEMBLY FOR A MAGNET VALVE

(75) Inventors: Hubert Greif, Markgroeningen (DE); Timo Haegele, Gaildorf (DE); Stefan Plueschke, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 12/282,717

(22) PCT Filed: Feb. 16, 2007

(86) PCT No.: PCT/EP2007/051489
§ 371 (c)(1), (2), (4) Date: Sep. 12, 2008

(87) PCT Pub. No.: WO2007/118723
PCT Pub. Date: Oct. 25, 2007

(65) Prior Publication Data
US 2009/0058579 A1  Mar. 5, 2009

(30) Foreign Application Priority Data
Apr. 13, 2006 (DE) .......................... 10 2006 017 451

(51) Int. Cl.
*H01F 3/00* (2006.01)
(52) U.S. Cl. ........................................ 335/281; 335/220
(58) Field of Classification Search .......... 335/220–229, 335/281, 282; 251/129.15–129.17
See application file for complete search history.

(56) References Cited

U.S. PATENT DOCUMENTS

| | | | | |
|---|---|---|---|---|
| 3,942,069 A | * | 3/1976 | Kaneda | 315/99 |
| 4,196,751 A | * | 4/1980 | Fischer et al. | 137/625.65 |
| 4,413,244 A | * | 11/1983 | Hafner | 335/250 |
| 4,779,582 A | * | 10/1988 | Lequesne | 123/90.11 |
| 4,919,497 A | | 4/1990 | Kaes | |
| 5,653,422 A | | 8/1997 | Pieloth et al. | |
| 5,794,860 A | * | 8/1998 | Neumann | 239/585.3 |
| 6,027,049 A | | 2/2000 | Stier | |
| 6,515,565 B1 | | 2/2003 | Muramatsu et al. | |
| 6,732,998 B2 | * | 5/2004 | Sugawara et al. | 251/129.07 |
| 7,038,563 B2 | * | 5/2006 | Andoh et al. | 335/126 |
| 7,057,486 B2 | * | 6/2006 | Kiko | 336/178 |
| 7,584,727 B2 | * | 9/2009 | Liang et al. | 123/90.11 |
| 2003/0111563 A1 | * | 6/2003 | Tsuchiya et al. | 239/585.1 |
| 2004/0113731 A1 | * | 6/2004 | Moyer et al. | 335/220 |
| 2005/0230649 A1 | | 10/2005 | Scheibe | |
| 2007/0095745 A1 | | 5/2007 | Sebastian | |

FOREIGN PATENT DOCUMENTS

| | | |
|---|---|---|
| DE | 44 05 657 A1 | 8/1995 |
| DE | 197 12 591 A1 | 10/1998 |
| DE | 20 2004 006 156 U1 | 8/2004 |
| DE | 103 34 785 A1 | 2/2005 |
| EP | 0 302 250 A1 | 2/1989 |
| WO | WO 99/31678 A1 | 6/1999 |
| WO | WO 02/086918 A1 | 10/2002 |

* cited by examiner

*Primary Examiner* — Bernard Rojas
(74) *Attorney, Agent, or Firm* — Ronald E. Greigg

(57) ABSTRACT

The invention relates to a magnet assembly for a magnet valve. The assembly has an inner pole and an outer pole as well as a coil. The coil is arranged between the inner pole and the outer pole and the coil wound directly onto the inner pole. According to the invention, the magnet assembly is used for actuating a closing element in a magnet valve.

13 Claims, 5 Drawing Sheets

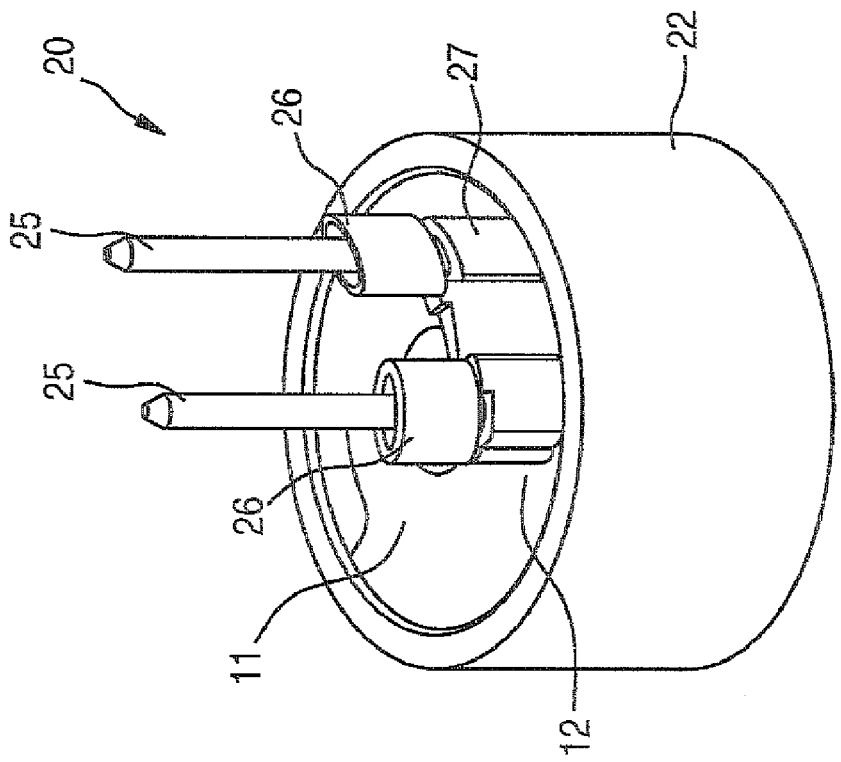

MAGNET ASSEMBLY FOR A MAGNET VALVE

CROSS-REFERENCE TO RELATED APPLICATION

This application is a 35 USC 371 application of PCT/EP 2007/051489 filed on Feb. 16, 2007.

BACKGROUND OF THE INVENTION

1. Field of the Invention

The invention relates to a magnet assembly for a magnet valve.

2. Description of the Prior Art

A magnet valve is used for instance for controlling the opening and closing motion of an injection valve member of a fuel injector. The magnet valve includes a magnet assembly, which includes an inner pole, an outer pole, and a coil located between them In magnet assemblies of the kind produced in the prior art, the coil is wound onto an electrically insulating coil holder. The coil, together with the coil holder, is inserted into an annular groove in a magnet core. The wall of the groove, which points toward the axis of the magnet core, forms the inner pole, and the opposite wall forms the outer pole. The width of the groove should be selected such that with an internally located coil holder, a gap is embodied between the individual windings of the coil and the outer pole. A disadvantage of the magnet assembly of the kind known from the prior art, particularly for use in fuel injectors, is that it requires a large amount of installation space. The magnet assembly determines the diameter of the magnet valve. Moreover, because of the coil holder made from insulating material, there is only limited thermal conductivity. Particularly in fast-switching magnet valves, this can lead to overheating of the coil. Moreover, because of the need for compactness and because of the dimensions of the coil holder, only a small number of windings is possible. Increasing the number of windings would necessitate a large coil diameter and thus lead to a larger magnet assembly.

SUMMARY OF THE INVENTION

In a magnet assembly embodied according to the invention for a magnet valve, which includes an inner pole, and outer pole, and a coil, the coil being located between the inner pole and the outer pole, the coil is wound directly onto the inner pole. By winding the coil directly onto the inner pole, the installation space occupied by the coil holder in the versions known from the prior art is smaller. As a result, less installation space is required for the magnet assembly. Moreover, to increase the magnetic force, it is possible to provide a larger number of windings in the same installation space.

To prevent a short circuit from being created, whenever the inner pole is made of an electrically conductive material, the inner pole is coated with an electrically insulating coating on the side pointing toward the coil. The coating is preferably a Parylene coating. This is an inert, hydrophobic, optically transparent, polymeric coating, which assures very good electrical installation with a high voltage strength and a low dielectric constant. The coating is micropore-free even beginning at a layer thickness of 0.2 μm. The coating is generally applied in a vacuum by condensation from the gas phase. As a result, even regions and structures that cannot be coated with liquid-based methods are achieved. The layer thickness that is applied according to the invention to the inner pole is preferably approximately 10 μm. The coil is then wound directly onto the coating of the inner pole. Because of the slight thickness of the coating, the heat produced in switching of the magnet valve is dissipated via the inner pole.

An outward-protruding enlargement that is press-fitted into the outer pole is preferably embodied on the inner pole. The outside diameter of the outward-protruding enlargement is greater than the outside diameter of the coil, so that once the magnet assembly is assembled between the coil and the outer pole, a gap is embodied. This prevents a short circuit from occurring between the coil and the outer pole.

To connect the coil to a voltage source, contact lugs are preferably embodied on the coil. So that the contact lugs can be connected to the voltage source, in a preferred embodiment a recess is embodied in the outward-protruding enlargement on the inner pole, by which recess the contact lugs are guided. This makes it possible to provide an individual recess for each contact lug or for all the contact lugs to be guided by the same recess. Care must merely be taken that the contact lugs not come into contact with the inner pole, the outer pole, or one another.

The contact lugs are preferably each connected to a contact pin, by way of which the magnet assembly can be electrically connected to the voltage source. The contact pins are preferably received, electrically insulated from one another, in a pin holder that is received in the recess in the outward-protruding enlargement of the inner pole. The electrical insulation is preferably attained by providing that the pin holder is made from an electrically insulating material. If the pin holder is not made from an electrically insulating material, then it is preferably provided with an electrically insulating coating.

The magnet assembly embodied according to the invention is preferably used for actuating a closing element in a magnet valve. In an especially preferred embodiment, the magnet valve, with the magnet assembly embodied according to the invention, is used in a fuel injector.

BRIEF DESCRIPTION OF THE DRAWINGS

The invention is described in further detail below in conjunction with the drawings, in which:

FIG. 6 shows a perspective view of a wound inner pole with contact pins;

FIG. 7 shows a perspective view of an assembled magnet assembly.

DESCRIPTION OF THE PREFERRED EMBODIMENT

Figure 1:
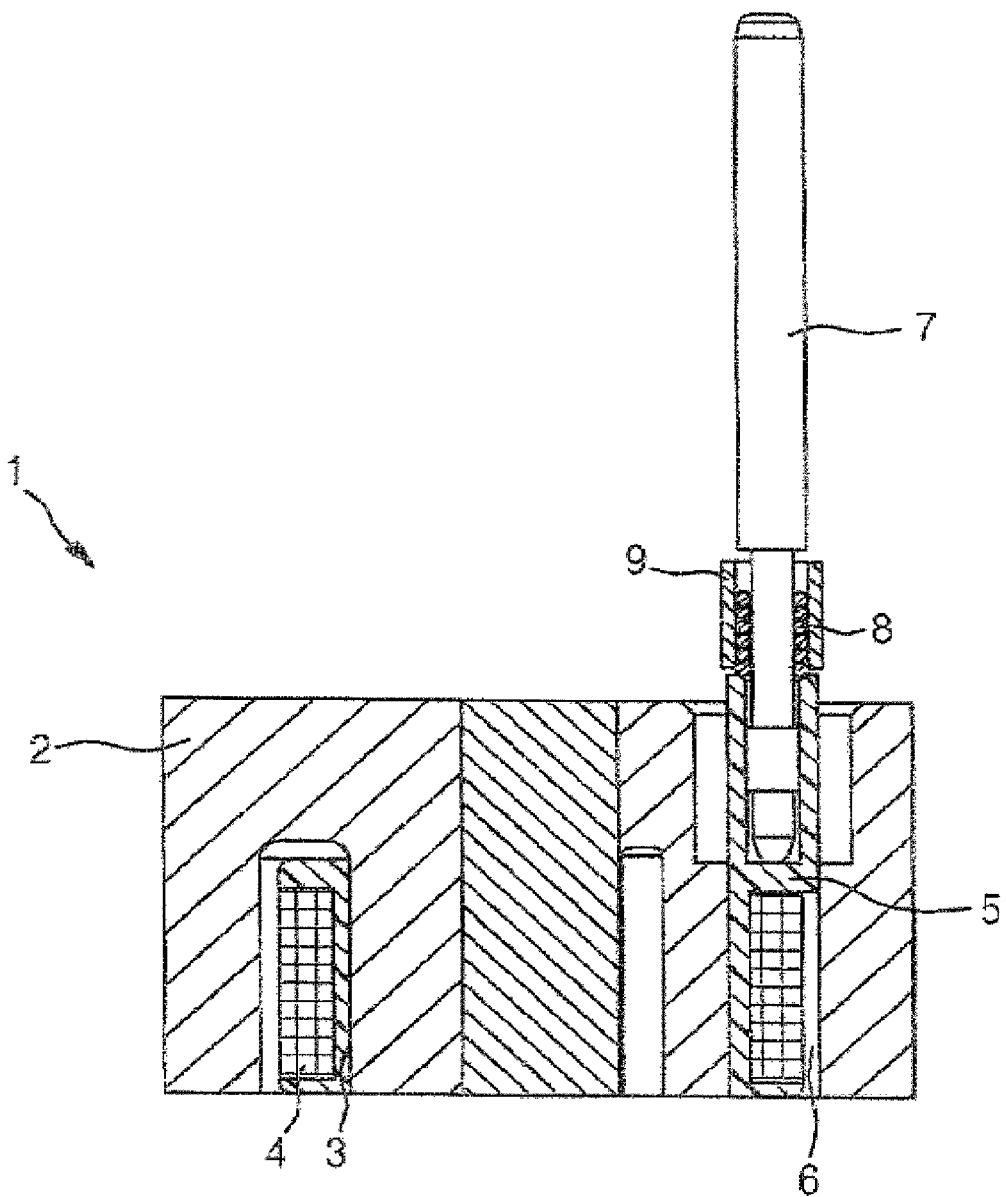
FIG. 1 is a section through a magnet assembly in accordance with the prior art.

FIG. 1 shows a magnet assembly in accordance with the prior art.

A magnet assembly 1 in accordance with the prior art includes a magnet core 2, in which a groove 3 is embodied. In the groove 3, a coil 4 is received that is wound onto a coil holder 5. The coil holder 5 is preferably made from an electrically insulating material, so that no electrical connection occurs between the coil 4 and the magnet core 2. On the outer circumference, a gap 6 is embodied between the coil 4 and the wall of the groove 3. By means of the gap, a short circuit is prevented from occurring between the coil 4 and the magnet core 2. The power supply to the coil 4 is effected via contact pins 7. The contact pins 7 are connected to the coil 4 with the aid of contact lugs 8, which are each wound around the contact pin 7. A welded sleeve 9 is disposed around the winding of the contact lug 8 around the contact pin 7. By means of the welded sleeve 9, the contact lug 8 is prevented from becoming detached from the contact pin 7.

Because of the coil holder 5, onto which the coil 4 is wound, additional installation space in the magnet assembly 1 is required. As a result, the necessary diameter of the magnet assembly 1 is increased. This is disadvantageous especially whenever magnet valves must that are as small as possible have to be used, because of the lack of installation space.

Figure 2:
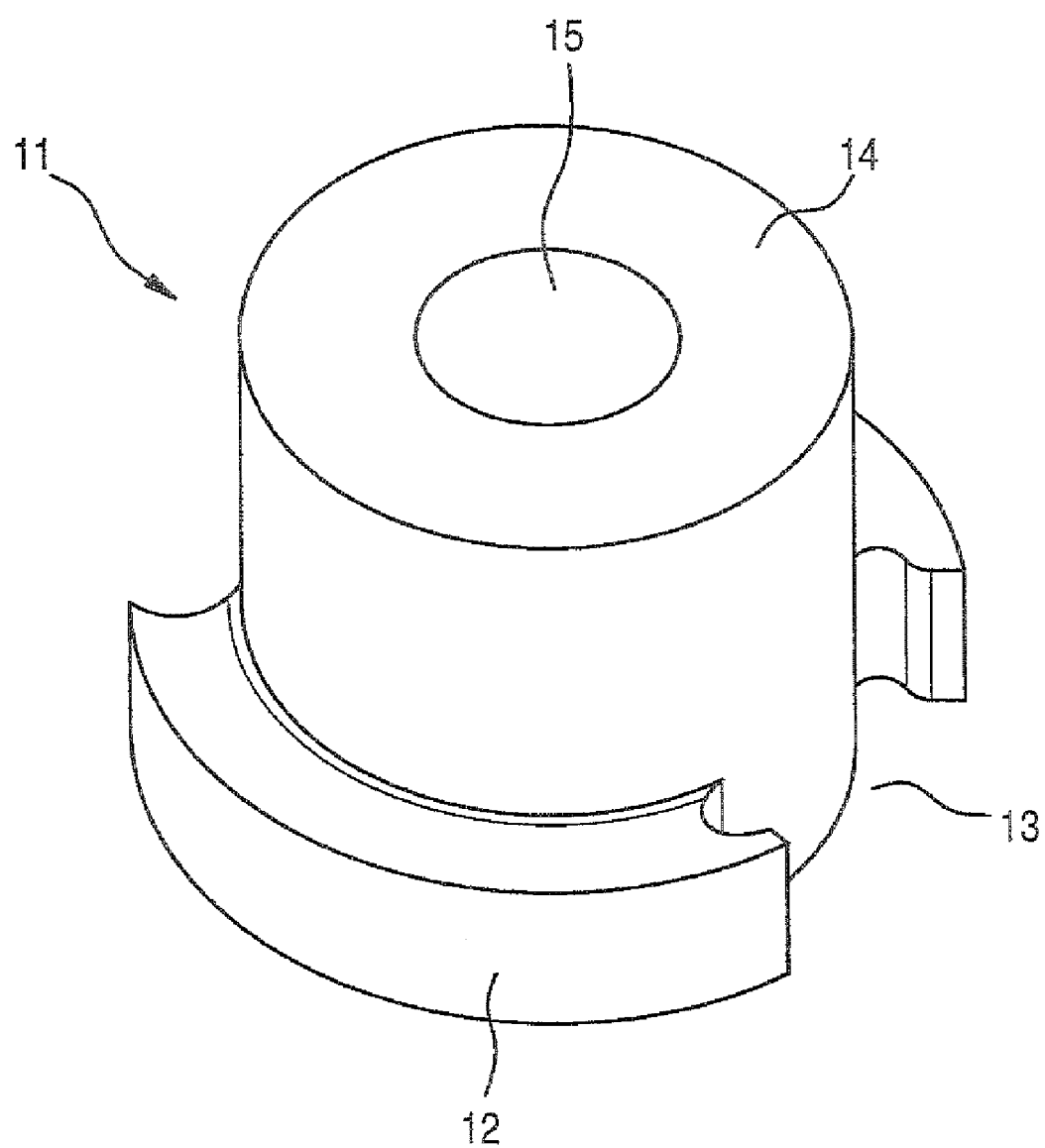
FIG. 2 is a perspective view of an inner pole.

In FIG. 2, an inner pole embodied according to the invention is shown in perspective.

On an inner pole 11 embodied according to the invention, an outward-protruding enlargement 12 is embodied. A recess 13 is embodied in the outward-protruding enlargement 12. The inner pole 11 furthermore includes a cylindrical body 14, onto which a coil, not shown in FIG. 2, is wound. To prevent a short circuit from occurring between the coil and the cylindrical body 14, the cylindrical body 14 is coated. The coating is preferably done with Parylene. As a result, even a coating with a thickness of only approximately 10 μm is sufficient to assure an adequate electrical insulation. Because of the slight thickness of the coating, however, the thermal insulation effect is only very slight, and thus the heat generated in the coil in the operation of the magnet assembly can be dissipated via the inner pole. In the interior of the cylindrical body 14, a bore 15 is provided, in which a valve spring, for example, can be guided, if the magnet assembly is used for actuating a magnet valve.

Figure 3:
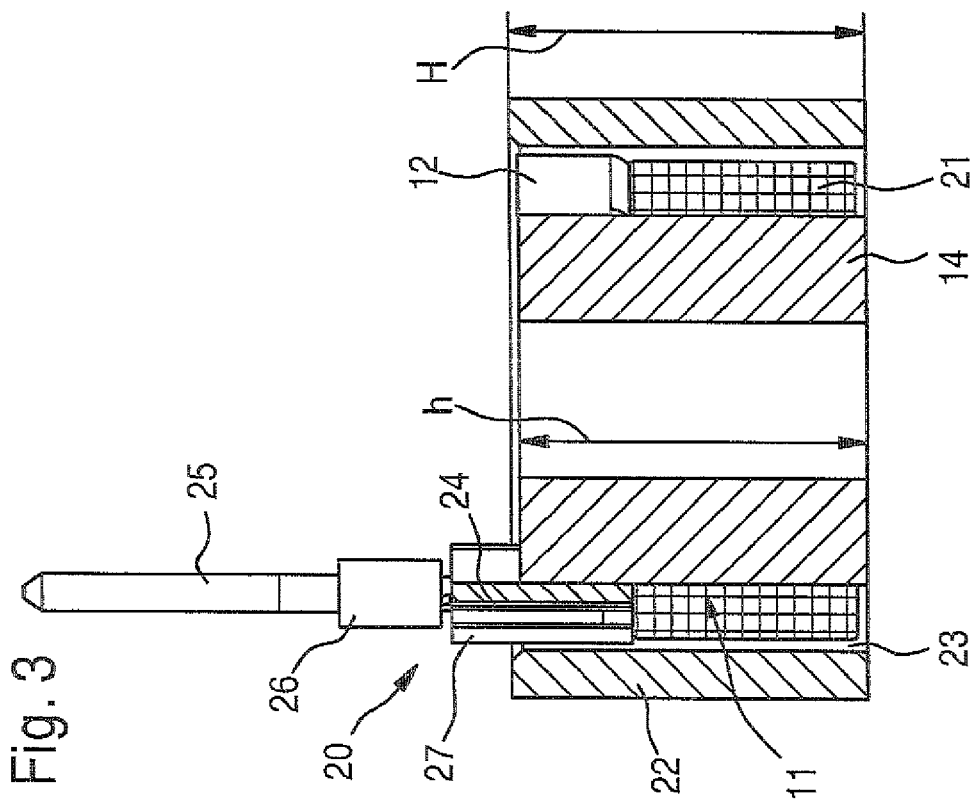
FIG. 3 is a section through a magnet assembly embodied according to the invention.

FIG. 3 shows a section through a magnet assembly embodied according to the invention.

A magnet assembly 20 embodied according to the invention includes the inner pole 11, onto the coated cylindrical body 14 of which a coil 21 is wound. The diameter of the coil 21 is less than the outside diameter of the outward-protruding enlargement 12. In this way, once an outer pole 22 has been pressed onto the outward-protruding enlargement 12, a gap 23 is embodied between the coil 21 and the outer pole 22.

The power supply to the coil 21 is effected via a contact lug 24, which is connected to a contact pin 25. For connecting the contact lug 24 to the contact pin 25, the contact lug 24 is wound around the contact pin 25 and then enclosed with a welded sleeve 26. A firm seat of the welded sleeve 26 is attained by securing it, for instance by resistance welding, to the winding by which the contact lug 24 is secured to the contact pin 25. However, any other mode of securing the welded sleeve is also conceivable. For instance, it may be secured by crimping. The contact pin 25 is received in a pin holder 27. To prevent current from being able to flow from the contact pin 25 to the inner pole 11 or to the outer pole 22, the pin holder 27 is preferably made from an insulating material. The preferred material is plastic. However, it is also possible to form the pin holder 27 of an electrically conductive material, which is then provided with an insulating coating.

In the embodiment shown in FIG. 3, the height h of the inner pole is less than the height H of the outer pole. This makes it possible to adjust a remnant air gap between the cylindrical body 14 of the inner pole 11 and an armature, not shown here, without making the total height of the magnet assembly greater than the height H of the outer pole 22.

Figure 4:
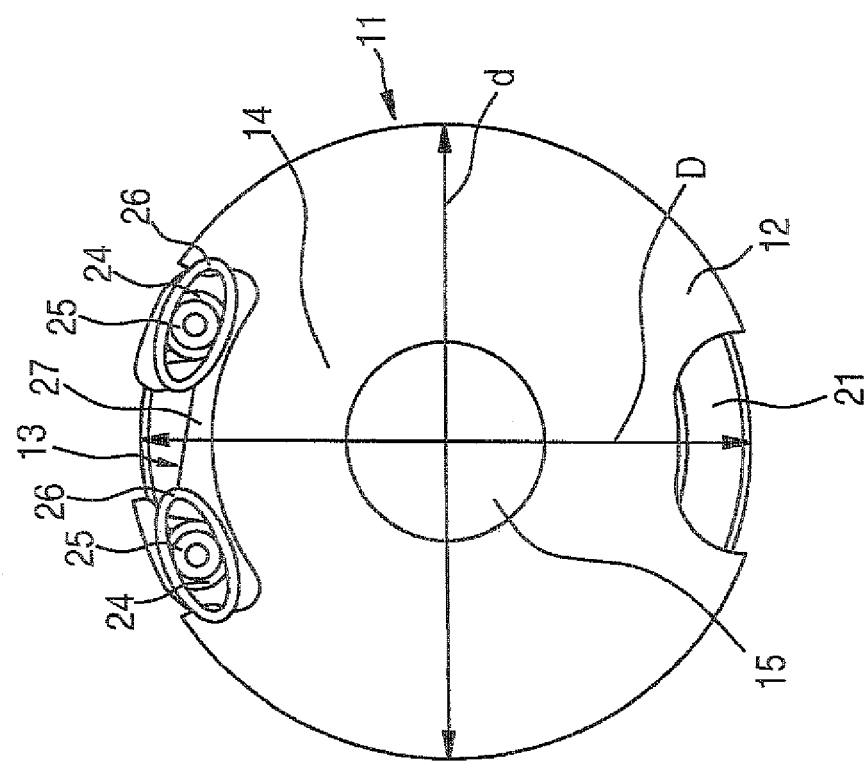
FIG. 4 shows a plan view on an inner pole with a coil and contact pins.

FIG. 4 shows a plan view on an inner pole, embodied according to the invention, with a coil and contact pins.

In the plan view shown in FIG. 4, it can be seen that the outside diameter d of the outward-protruding enlargement 12 of the inner pole 11 is greater than outside diameter D of the coil 21. The width of the gap 23 is the result of the difference between the outer diameter d of the outward-protruding enlargement 12 and the outer diameter D of the coil 21.

It can also be seen in the plan view shown in FIG. 4 that for supplying voltage to the coil 21, two contact pins 25 are provided. The two contact pins 25 are received in the pin holder 27. To put the coil 21 into electrical contact with the contact pins 25, the contact lugs 24 are wound around the contact pins 25 and then surrounded with the welded sleeves 26. The welded sleeves 26 are welded, for example by resistance welding, around the coiled contact lugs 24, so as to attain a stable connection.

Figure 5:
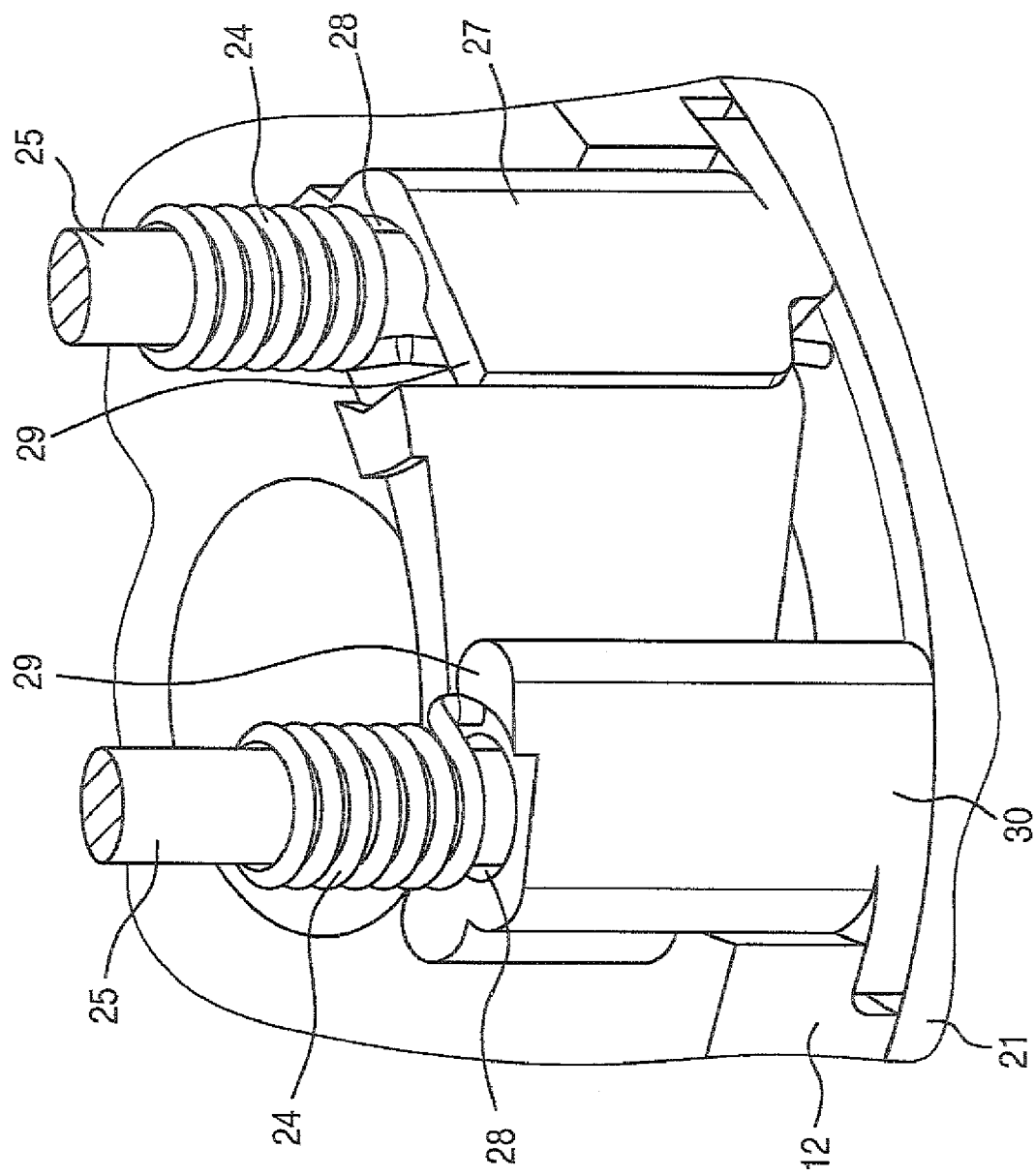
FIG. 5 shows a perspective detail view of the electrical connection of the coil.

FIG. 5 shows a perspective view of the pin holder with the contact pins and contact lugs.

It can be seen from FIG. 5 how the contact lugs 24 are wound around the contact pins 25. Because the contact pins 25 are wrapped with the contact lugs 24, they are pre-fixed, even before the actual connection by material or positive engagement is done. A stable electrical connection is then preferably attained by resistance welding.

In the embodiment shown here, the contact pins 25 are retained in receptacles 28 in the pin holder 27. The diameter of the receptacles 28 is less than the diameter of the contact pins 25, so that the latter are clamped in the receptacle 28. Tabs 29 are embodied on the receptacles 28, and the contact pins 25 are guided in the tabs. At the same time, the tabs 29 serve the purpose of electrical insulation from the outer pole 22.

The pin holder 27 is received in the recess 13 in the outward-protruding enlargement 12. To make the installation of the inner pole 11 in the outer pole 22 possible, which is not shown in FIG. 5, the diameter of the outer face 30 must not be any larger than the diameter of the outward-protruding enlargement 12.

FIG. 6 shows a perspective view of an inner pole, embodied according to the invention, with a coil and contact pins.

In the perspective view in FIG. 6, it can be seen that the outer face 30 of the pin holder 27 does not protrude past the outward-protruding enlargement 12 of the inner pole 11. However, it is possible for the outer face 30 to protrude past the outside diameter of the coil 21 to the same extent as the outward-protruding enlargement 12.

In the view shown in FIG. 6, the contact lugs 24 (not visible) wound around the contact pins 25 are enclosed by the welded sleeves 26. As can be seen from FIG. 6, the welded sleeves 26 are installed over the windings of the contact lugs 24 (not visible), so as to attain a stable connection.

FIG. 7 shows a completely assembled magnet assembly.

In the completely assembled magnet assembly 20, the inner pole 11, onto which the coil 21 is wound, is press-fitted with the outward-protruding enlargement 12 into the outer pole 22. By press-fitting the outward-protruding enlargement 12 into the outer pole 22, a stable connection is attained.

For producing the magnet assembly 20 embodied according to the invention, an inner pole 11 is preferably first made from a highly permeable, resistive material, preferably a soft magnetic powder composite material, by compaction. In a next step, the inner pole 11 is provided with an electrically insulating coating. Parylene is preferably used for this. After the coating, the outward-protruding enlargement 12 is ground to its outside diameter d. Next, the coil 21 is wound onto the cylindrical body 14 of the inner pole 11. After the coil has been wound, it is put into electrical contact with the contact pins 25, which are received in the pin holder 27.

In a first step, the outer pole 22 is ground on its inside diameter and on the contact and stop faces to a fit to the inner pole 11. Next, in a further step, the stop face may be chromium-plated. Finally, the inner pole 11 is press-fitted into the outer pole 22.

In a preferred embodiment, after the inner pole 11, with the coil 21 and the contact pins 25, is joined to the outer pole 22, the entire magnet assembly 20 is extrusion-coated with a plastic, preferably a thermoplastic, or encapsulated with a reaction resin.

The foregoing relates to the preferred exemplary embodiment of the invention, it being understood that other variants and embodiments thereof are possible within the spirit and scope of the invention, the latter being defined by the appended claims.

The invention claimed is:

1. A magnet assembly for a magnet valve, comprising:
an inner pole:
an outer pole;
a coil being disposed between the inner pole and the outer pole, wherein the coil is wound directly onto the inner pole, said coil having an outside diameter,
a layer of electrical insulation between the inner pole and the coil;
said inner pole comprising an outward-protruding enlargement having an outer edge which protrudes past the outside diameter of said coil, said inner pole being press-fitted into the outer pole such that a gap exists between the coil and the outer pole,
wherein said outward-protruding enlargement includes a recess which extends inwardly from the outer edge of the enlargement, and
wherein at least one contact lug is received in the recess.

2. The magnet assembly according to claim 1, wherein the layer of electrical insulation is embodied as of a coating on the inner pole.

3. The magnet assembly according to claim 2, wherein the coating is a Parylene coating.

4. The magnet assembly according to claim 1, wherein the at least one contact lug is connected to a contact pin, by way of which the magnet assembly can be put into electrical contact with a voltage source.

5. The magnet assembly according to claim 4, further comprising a plurality of contact pins which are received, and electrically insulated from one another, in a pin holder, which is received in the recess of the outward-protruding enlargement.

6. The magnet assembly according to claim 5, wherein the pin holder is made from an electrically insulating material.

7. The magnet assembly according to claim 4, further comprising a plurality of contact pins and a plurality of receptacles, each pin being received in its own receptacle, and wherein each receptacle comprises tabs which provide electrical insulation from the outer pole.

8. The magnet assembly according to claim 7, further comprising a pin holder which receives the plurality of receptacles.

9. The magnet assembly according to claim 7, wherein each receptacle is smaller than each pin such that each pin is clamped in its respective receptacle.

10. The use of a magnet assembly as defined by claim 1 comprising a step of actuating a closing element in a magnet valve.

11. The use as defined by claim 10, wherein the magnet valve is used in a fuel injector.

12. The magnet assembly according to claim 1, wherein a height of the inner pole is less than a height of the outer pole.

13. The magnet assembly according to claim 1, wherein the recess extends radially inwardly toward a center of the inner pole from a radial outer edge of said outward-protruding enlargement.

* * * * *